United States Patent
Svensson et al.

(10) Patent No.: US 10,172,282 B2
(45) Date of Patent: Jan. 8, 2019

(54) PLATE SPRING ADAPTED TO HOLD A TOOL, A TOOL, A TOOL HOLDER, A ROBOTIC WORK TOOL AND A ROBOTIC WORKING TOOL SYSTEM

(71) Applicant: HUSQVARNA AB, Huskvarna (SE)

(72) Inventors: Mats Svensson, Huskvarna (SE); Magnus Öhrlund, Malmbäck (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/116,256

(22) PCT Filed: Feb. 3, 2014

(86) PCT No.: PCT/SE2014/050133
§ 371 (c)(1),
(2) Date: Aug. 3, 2016

(87) PCT Pub. No.: WO2015/115955
PCT Pub. Date: Aug. 6, 2015

(65) Prior Publication Data
US 2017/0006776 A1   Jan. 12, 2017

(51) Int. Cl.
*B25B 11/00* (2006.01)
*A01D 34/73* (2006.01)
*A01D 34/00* (2006.01)

(52) U.S. Cl.
CPC ......... *A01D 34/733* (2013.01); *A01D 34/736* (2013.01); *A01D 34/008* (2013.01)

(58) Field of Classification Search
CPC .... B25B 1/00; B25B 3/00; B25B 5/00; B25B 11/00; B25B 7/00
See application file for complete search history.

(56) References Cited

U.S. PATENT DOCUMENTS

| | | |
|---|---|---|
| 3,507,104 A | 4/1970 | Kline et al. |
| 3,604,189 A | 9/1971 | Harer et al. |
| 3,958,402 A | 5/1976 | Bouet |
| 4,313,297 A | 2/1982 | Maier |

(Continued)

FOREIGN PATENT DOCUMENTS

| | | |
|---|---|---|
| AU | 2012200915 A1 | 9/2012 |
| CN | 201426049 Y | 3/2010 |

(Continued)

OTHER PUBLICATIONS

International Search Report and Written Opinion for International Application No. PCT/SE2014/050133 dated Nov. 5, 2014.

(Continued)

*Primary Examiner* — Lee D Wilson
(74) *Attorney, Agent, or Firm* — McNair Law Firm, P.A.

(57) ABSTRACT

A plate spring may be adapted to hold a tool to a tool holder, where the tool and the tool holder are adapted to be arranged in a robotic work tool. The plate spring includes a first part which is adapted to fixate the plate spring to the tool holder, and a second part which is adapted to hold the tool to the tool holder. A middle part connects the first part of the plate spring to the second part. The plate spring enables convenient, quick-shifting of tools on robotic work tools, such as quick-shifting of knife blades on a robotic lawn mower.

14 Claims, 4 Drawing Sheets

(56) References Cited

U.S. PATENT DOCUMENTS

| | | | | |
|---|---|---|---|---|
| 4,828,240 | A * | 5/1989 | Longenecker | B23Q 3/103 269/100 |
| 5,561,972 | A * | 10/1996 | Rolfe | A01D 34/005 56/17.5 |
| 5,788,225 | A * | 8/1998 | Iwata | B23Q 3/103 269/309 |
| 5,916,111 | A | 6/1999 | Colens | |
| 6,262,582 | B1 * | 7/2001 | Barringer | G01R 31/2887 269/254 CS |
| 6,829,878 | B1 | 12/2004 | Hoffman | |
| 7,753,350 | B2 * | 7/2010 | Barziza | B23Q 3/102 269/100 |
| 8,931,772 | B2 * | 1/2015 | Phillips | B25B 5/06 269/289 R |
| 2011/0194885 | A1 | 8/2011 | Whitenight et al. | |
| 2016/0360695 | A1 * | 12/2016 | Klackensjo | A01D 34/73 |
| 2017/0006776 | A1 * | 1/2017 | Svensson | A01D 34/733 |
| 2018/0103583 | A1 * | 4/2018 | Stridh | A01D 34/736 |

FOREIGN PATENT DOCUMENTS

| | | |
|---|---|---|
| CN | 103141210 A | 6/2013 |
| DE | 2040753 A1 | 2/1972 |
| DE | 2900448 A1 | 7/1980 |
| DE | 19521067 A1 | 12/1996 |
| DE | 10036552 A1 | 2/2002 |
| DE | 20308046 U1 | 7/2003 |
| EP | 2412221 A2 | 2/2012 |
| EP | 2727450 A1 | 5/2014 |
| GB | 1165297 A | 9/1969 |
| WO | 2011115536 A1 | 9/2011 |
| WO | 2012068657 A1 | 5/2012 |

OTHER PUBLICATIONS

International Preliminary Report on Patentability for International Application No. PCT/SE2014/050133 dated Aug. 9, 2016.

* cited by examiner

PLATE SPRING ADAPTED TO HOLD A TOOL, A TOOL, A TOOL HOLDER, A ROBOTIC WORK TOOL AND A ROBOTIC WORKING TOOL SYSTEM

TECHNICAL FIELD

This application relates to fastening of tools, such as knives, to robotic work tools. In particular it relates to fastening means for holding rotating knives on robotic lawn movers.

BACKGROUND

Traditionally, lawn movers are used to cut the grass of lawns in gardens. On lawn movers which are operated by motors, a rotating knife is commonly arranged under a motor of the lawn mover. Such a rotating knife has two cutting edges which sweep over the lawn to cut the grass.

Contemporary robotic lawn movers have been popular in modern gardening. They are constructed to operate on a lawn more or less constantly, and are often energized by solar panels. To enable robotic lawn movers to drive automatically and constantly, they are to be design with low weight and with small rotating mass. For instance, one single large rotating knife would consume too large amounts of energy. Typically instead, a plurality of knife blades are mounted on a rotating disc, e.g. tree blades each 120 degree along a circumference of the disc, and the disc is made of plastic or any other light-weight material. The knife blades are rotatable fixated to the disc by a fixating element, such as a screw. The knife blades are provided with a hole. By mounting a screw through each of the holes, the knife blades will be rotatably fixed to the disc, i.e. the knife blades will be mounted to the disc, but are free to rotate around the holes. In situations where knife blades hit objects, the knife blades will turn around the screw, such that the cutting edges will be turned away from the object. Thereby, the cutting edges will be protected from damages which may cause decreased sharpness. In addition, unintentionally hit objects may be protected from being cut. The screws will be adjusted such that hits with grass straws do not give rise to a turning of the knife blades. Normally, because of the constant operation of the lawn mover, the grass will not be allowed to grow too long and the resistance of the grass will be small.

The knife blades are losing their sharpness after a time period and may be removed to be exchanged, e.g. due to the cutting movement or upon occasional hits of stones and sand. Used blades are then removed after removal of the fixating screws.

However, removal of knife blades, and mounting of new knife blades require tools, e.g. a screw driver, an allen key, or a wrench, and an operator needs access to specific tools during operation. The knife blades need also to be appropriately adjusted, i.e. the screws will be tightened such that the knife blades will be turned by accidental contact with objects but not by contact with grass straws. In addition, robotic lawn movers may be equipped with a considerable amount of knife blades, and performing exchange of knife blades may therefore be time consuming.

Thus, there is a need of a simplified and efficient process for exchange of knife blades on robotic lawn movers.

SUMMARY

It is an object of the teachings of this application to overcome the problems listed above by providing a plate spring which is adapted to hold a tool to a tool holder, wherein said tool holder is adapted to be arranged in a robotic work tool. The plate spring comprises a first part which is adapted to fixate the plate spring to the tool holder, and a second part which is adapted to hold the tool to the tool holder. A middle part connects the first part to the second part. A hole is arranged at a position of the second part corresponding to a position of a tool attachment means of the tool holder, such that when the second part of the plate spring is pulled in a direction from the tool holder, the tool attachment means is exposed, and when the second part of the plate spring is released, the hole is pulled over a first end of the tool attachment means. In one embodiment the first part may be adapted to be held to the tool holder, by a spring attachment means of the tool holder. The first part of the plate spring may comprise at least one of: a hole, a recess, and a pin. In one embodiment, the plate springs may be integrated with the tool holder and be mounted to the tool holder during manufacturing of the tool holder, e.g. by lamination. The tool holder may be disc-shaped, polygon-shaped, or formed as one or several arms adapted to rotate, with a plurality of tool attachment means.

It is also an object of the teachings of this application to overcome the problems listed above by providing a tool which is adapted to be held to a tool holder by a plate spring. The tool comprises a hole in a position, such that when the hole is pulled over a first end of a tool attachment means of the tool holder, and the tool is pulled in a radial direction of the tool holder, the first end of the tool attachment means attaches the tool pivotably to the tool holder. In one embodiment the tool is implemented as a knife blade.

It is also an object of the teachings of this application to overcome the problems listed above by providing a tool holder which is adapted to hold at least one tool and is further adapted to be arranged in a robotic work tool. The tool holder comprises at least one tool attachment means and at least one spring attachment means, wherein each of the at least one tool attachment means is positioned along a periphery of the tool holder, and a respective one of the at least one spring attachment means is positioned at the tool holder, such that when a plate spring is attached to the respective one of the at least one spring attachment means the plate spring holds a tool to the tool holder.

It is also an object of the teachings of this application to overcome the problems listed above by providing a robotic work tool which comprises a tool holder, at least one tool, and at least one plate spring according to any of the above defined objects. The tool holder is arranged at a lower surface of the robotic work tool, such that when the tools are fixated to the tool holder by the tool attachment means, the plate springs are fixated to the tool holder and hold the tools, and the robotic work tool is enabled to sweep the tools over a ground surface. In one embodiment, the tool holder is disc-shaped, polygon-shaped, or implemented as one or a number of arms adapted to rotate, and provided by a plurality of tool attachment means and respective spring attachment means. In another embodiment the robotic work tool is a robotic lawn mover, a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a robotic work tool system which comprises a tool holder according to any of the above defined objects above.

The inventors of the present invention have realized, after inventive and insightful reasoning that as the centrifugal power of the disc will direct the knife blades out from the disc during operation, such that the cutting edges of the blades are cutting grass (even if they are temporarily angled around the screw in the hole) the same centrifugal force can be used to keep the knife blades in place around a pin or such extending through the hole in the knife blade, as the centrifugal force can be used to push the knife blade against the pin.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The solution will now be described in more detail by means of exemplary embodiments and with reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
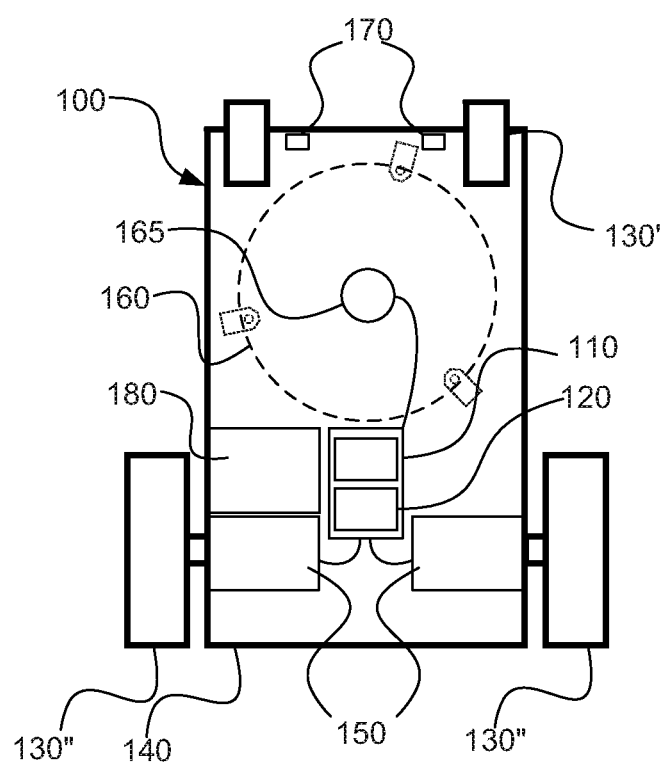
FIG. 1 is a schematic overview of a robotic working tool according to one embodiment of the teachings herein.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively or additionally be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

Figure 2:
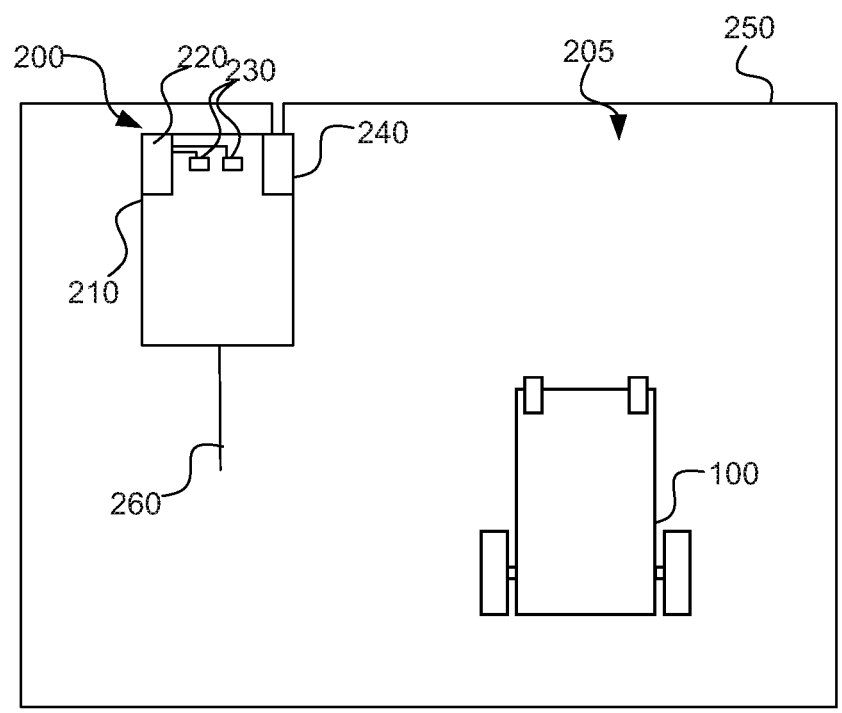
FIG. 2 is a schematic overview of a robotic working tool system according to one embodiment of the teachings herein.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. As is known in the art, the control signal will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. Optionally, the charging station 210 also has a guide cable 260 for enabling the robotic work tool to find the entrance of the charging station 210.

Figure 3:
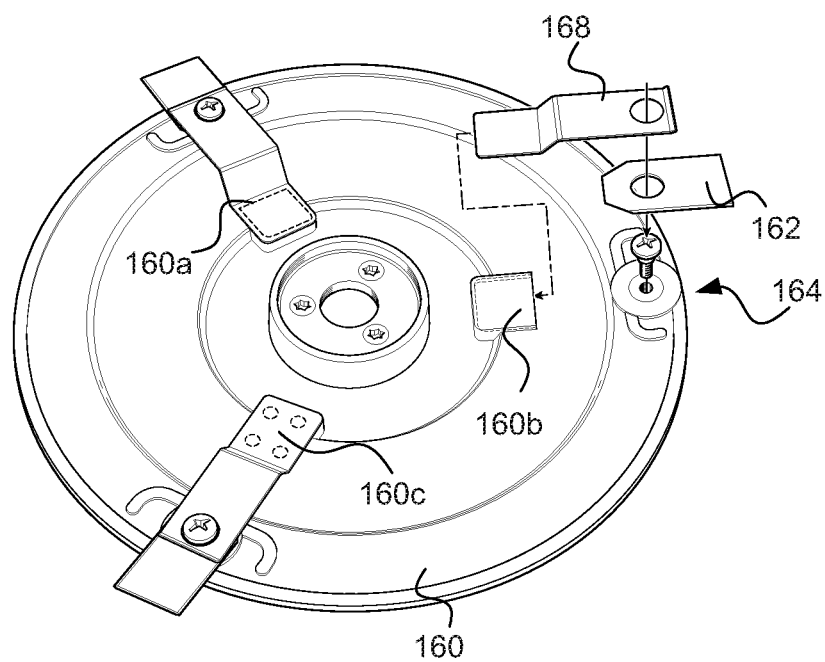
FIG. 3 is a schematic illustration of parts of a robotic tool according to one embodiment of the teachings herein.

FIG. 3 shows a schematic view of a tool holder 160, in accordance with one exemplifying embodiment. The tool holder 160 is adapted to be mounted to a robotic working tool 100 and comprises three tool attachment means 164 and three spring attachment means 160a, 160b, 160c. It should be noted that although FIG. 3 shows three spring attachment means and three tool attachment means, the teachings of this application may also be used with other number of spring attachment means and tool attachment means. The tool holder 160 is disc-shaped and the tool attachment means 164 and the spring attachment means 160, 160b, 160c are positioned at the tool holder 160 in pairs, such that each tool attachment means 164 is positioned outside one respective spring attachment means 160a, 160b, 160c along a radius of the tool holder 160. In other words, the spring attachment means 160a, 160b, 160c are positioned closer to a centre of the tool holder 160, than the respective tool attachment means 164. By arranging the tool attachment means 164 evenly distributed along a circumference of the tool holder 160, an axis of rotation will be less influenced by vibrations during operation and a smoother movement of the working tool 100 will be achieved. The tool attachment means 164 are in this embodiment implemented as threaded holes in the tool holder 160 adapted to get respective screws or bolts mounted therein. When a tool 162 is attached to the tool holder 160, a hole of the tool 162 is pulled over a first end of the tool attachment means 164, i.e. over a head of the screw or bolt. The tool attachment means will hereafter be referred to as a screw but it should be noted that other forms (such as bolts) may also be used. Then the tool 162 is pulled in a direction of the radius of the tool holder 160. Thereby, the head of the screw will hold the tool 162 to the tool holder 160, i.e. the head of the screw will act as a first tool attachment means.

The tool 162 will be able to rotate around an axis of the screw when attached to the tool holder 160, i.e. the tool 162 will be pivotably attached to the tool holder (160). Normally, the centrifugal forces will direct the tools 162 out from the tool holder during operation, but upon an unintentional hit with an object during rotation of the tool holder 160, the tool will be able to rotate around the axis of the screw. Thereby, the tools 162 and the objects may be saved from being damaged. One advantage of implementing the tool attachment means 164 as threaded holes is that a mounted screw may be replaced by a new one. Thereby, a worn screw could be replaced before being broken, which prevents tools 162 from get loose from the tool holder 160 and increases security. However, other alternative tool attachment means 164 may be implemented instead within the inventive concept, e.g. knobs or pins.

The spring attachment means 160a, 160b, 160c are arranged to receive and hold plate springs 168 to the tool holder 160. As seen in the figure, the spring attachment means 160a, 160b, 160c may by implemented in several ways, e.g. an area for gluing 160a, soldering, or welding 160c, slots 160b, holes for screwing or riveting, etc. Alternatively, the plate springs 168 may be integrated with the tool holder 160. For instance, the plate springs 168 may mounted to the tool holder 160 by lamination, gluing, or moulding when manufacturing the tool holder 160. The material of the tool holder or a glue forms then the spring attachment means 160a, 160b, 160c.

When the plate springs 168 are attached to the tool holder 160, they will hold the tool 162 to the tool holder 160 and act as second tool attachment means, which will be further discussed in below in conjunction with another exemplifying embodiment. As stated above, "hold" means here that the tool is 162 is pivotably attached to the tool holder 160, i.e. the tool 162 is hold in a position of the tool holder 160 but is able to rotate around and axis of the tool 162.

It is to be noted that even if the above described tool holder 160 comprises three tool attachment means and three spring attachment means, the inventive concept is not limited thereto. A designer may select any appropriate number of tool attachment means and spring attachment means when implementing the tool holder 160. Furthermore, the spring attachment means 160a, 160b, 160c may be alternatively arranged at the tool holder 160 within the disclosed concept. For instance, the spring attachment means 160a, 160b, 160c may be placed before or after a respective tool attachment means 164 in a rotational direction of the tool holder 160. One spring attachment means 160a, 160b, 160c may further be adapted to attach two tools 162 at different positions of the tool holder 160. For instance, such a multiple tool spring attachment means may be arranged at a position between two following tool attachment means 164 of the tool holder 160.

Even if the tool holder 160 is illustrated as a disc in the figure, the concept is not limited thereto, a designer is free to implement the tool holder 160 differently within the disclosed concept, e.g. as an oval, a polygon, or as an arm, with a suitable number of tool attachment means 164.

Figure 4A:
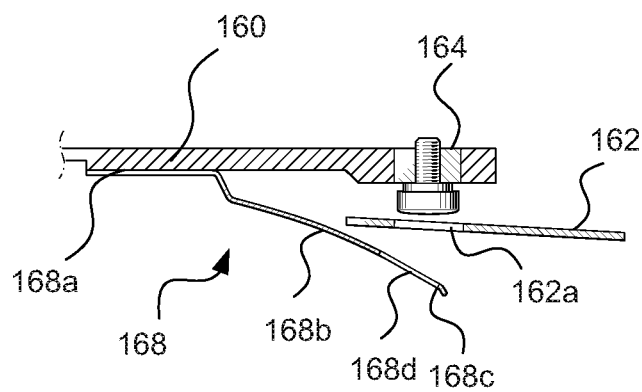
FIG. 4 are schematic illustrations of parts of a robotic tool according to one embodiment of the teachings herein.
Figure 4B:
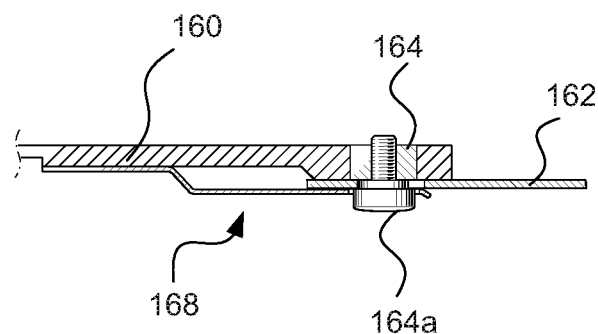

FIG. 4a-b shows schematic views of a plate spring 168 a tool 162, and a tool holder 160, in accordance with one exemplifying embodiment.

The plate spring 168 comprises three parts. A first part 168a of the plate spring 168 is adapted to be fixated to a tool holder 160. A second part 168c of the plate spring 168 is adapted to hold the tool 162 against the tool holder 160. A middle part 168b of the plate spring 168 connects the first part 168a and the second part 168c. A tool attachment means 164 is implemented as a threaded hole in the tool holder 160. In the figures is further illustrated that a screw introduced in the threaded hole. A head of the screw constitutes then a first end 164a of the tool attachment means 164 when introduced.

FIG. 4a illustrates a situation when the second part 168c is pulled in a direction from the tool holder 160. The head of the screw is then exposed, and a tool 162 could be attached to the tool holder 160, by pulling a hole 162a of the tool 162 over the head of the screw.

FIG. 4b illustrates a situation when the second part 168c is released and has returned to the tool holder 160. Furthermore, in FIG. 4a it is shown that the tool 162 has been pulled in a direction along a radius of the tool holder 160 out from the centre of the tool holder 160, such that the tool 162 is held by the head of the screw towards a surface of the tool holder 160. In other words, the centre of the hole 162 is displaced by an offset to an axis of the screw. As stated above, this could be seen as a first attachment means. When releasing the second end 168c of the plate spring 168, a hole 168d of the plate spring 168 is pulled over the head of the screw or bolt, i.e. the first end 164a of the tool attachment means 164, and achieves thereby a pressing force on the tool 162 towards the tool holder 160. The size of the pressing force will be large enough to achieve that the second end 168c of the plate spring 168 springs back when released, but does not prevent the tool 162 from pivoting. When put into practice, the tool 162 will not abut the too holder 160, instead there will be a small gap there between which facilitate pivoting of the tool 162. It is to be noted that even if the second end 168c of the plate spring 168 exerts a pressing force on the tool 162 towards the tool holder 160 in this exemplifying embodiment, a designer is free to implement the second end 168c alternatively within the disclosed concept. For instance, may he/she may implement the plate spring 168, such that the second end 168c presses against the tool attachment means 164, and merely holds the tool 162 to the tool holder 160. Moreover, when put into practice and to in order to facilitate pivoting of the tool 162, the plate spring 168 pressing force As stated above, this could be seen as a second tool attachment means. By providing first and second tool attachment means to the tool holder 160, an increased reliability of tool attachment could be achieved, which give rise to safe operation of the robotic working tool.

In this embodiment, the plate spring 168 is constructed of a material, e.g. spring steel, such that the middle part 168b is resilient and enables the second end 168c to be pulled in a direction from the tool holder 160, and that the second end 168c returns to the tool holder 160 when being released.

By providing both the tools 162 and the plate springs 168 with holes 162a, 168d, the tools 162 can be exchanged without having access to external tools like screwdrivers, allen keys, wrenches, etc., and thereby a convenient quick-shifting of tools 162 on robotic working tools is achieved. It is to be noted that a designer is not limited to form holes 168d of the plate spring 168, other alternative means could be formed in the plate springs 168 instead, within the disclosed concept, such as recesses or depressions. However, holes 168d achieve the further advantage that the tool attachment means 164 will accessible for adjustments after exchange of the tools 162. Moreover, the holes 168d of are not limited to be circular. A designer may implement the holes alternatively within the concept when appropriate, e.g. as ovals, squares, slots, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A plate spring adapted to hold a tool to a tool holder, wherein said tool holder is adapted to be arranged in a robotic work tool, the plate spring comprising:
   a first part adapted to fixate the plate spring to the tool holder,
   a second part adapted to hold the tool to the tool holder, and
   a middle part connecting the first part to the second part, wherein a hole is arranged at a position of the second part corresponding to a position of a tool attachment means of the tool holder, such that when the second part of the plate spring is pulled in a direction from the tool holder, the tool attachment means is exposed, and when the second part of the plate spring is released, the hole is pulled over a first end of the tool attachment means.

2. The plate spring according to claim 1, wherein at least one of the middle part and the second part comprises spring steel.

3. The plate spring according to claim 1, wherein the first part is adapted to be fixated to the tool holder by a spring attachment means of the tool holder.

4. A tool adapted to be held to a tool holder, the tool holder comprising a plate spring, the tool comprising a hole in a position, such that when the hole is pulled over a first end of a tool attachment means of the tool holder, and the tool is pulled in a radial direction of the tool holder, the first end of the tool attachment means in conjunction with the plate spring attaches the tool pivotably to the tool holder.

5. The tool according to claim 4, wherein a diameter of the hole is larger than a diameter of the first end of the tool attachment means.

6. The tool according to claim 4, being implemented as a knife blade and comprising at least one cutting edge.

7. A tool holder adapted to hold at least one tool and adapted to be arranged in a robotic work tool, the tool holder comprising at least one tool attachment means and at least one spring attachment means, wherein each of the at least one tool attachment means is positioned along a periphery of the tool holder, and a respective one of the at least one spring attachment means is positioned at the tool holder, such that when a plate spring is attached to the respective one of the at least one spring attachment means the plate spring holds the at least one tool to the tool holder.

8. The tool holder according to claim 7, wherein the at least one tool attachment means are implemented as threaded holes adapted to receive screws or bolts, such that when the screws or bolts are received, heads of the screws or bolts constitute first ends of the at least one tool attachment means.

9. The tool holder according to claim 7, wherein the at least one tool attachment means are implemented as knobs, wherein heads of the knobs constitute first ends of the at least one tool attachment means.

10. The tool holder according to claim 7, wherein the at least one spring attachment means are implemented as at least one of: notches, slots, holes, areas for gluing, soldering, or welding, and threaded holes, and wherein each of the at least one spring attachment means are adapted to receive a first part of a respective plate spring, the first part adapted to fixate the respective plate spring to the tool holder.

11. The tool holder according to claim 7, wherein the tool holder is disc-shaped, and provided with a plurality of tool attachment means and respective spring attachment means.

12. The tool holder according to claim 7, wherein the tool holder is polygon-shaped, and provided with a plurality of tool attachment means and respective spring attachment means.

13. The tool holder according to claim 7, wherein the tool holder is formed as at least one arm adapted to rotate around an axis, and provided with a plurality of tool attachment means and respective spring attachment means.

14. A robotic work tool comprising a tool holder, at least one tool, and at least one plate spring, wherein the tool holder is arranged at a lower surface of the robotic work tool, such that when the at least one tool is held to the tool holder by a tool attachment means, the at least one plate spring is fixated to the tool holder and holds the at least one tool to the tool attachment means and the tool holder, and the robotic work tool is enabled to sweep the at least one tool over a ground surface.

* * * * *